Sept. 15, 1959　　　　　J. KRUK　　　　　2,904,084
POWER-OPERATED SCREW FEED AND DRIVE MECHANISM
Filed March 31, 1958　　　　　　　　　　3 Sheets-Sheet 1

INVENTOR.
JOHN KRUK
BY Thredy & Thredy
HIS ATTORNEYS.

Sept. 15, 1959 J. KRUK 2,904,084
POWER-OPERATED SCREW FEED AND DRIVE MECHANISM
Filed March 31, 1958 3 Sheets-Sheet 3

INVENTOR.
JOHN KRUK
BY Threedy & Threedy
HIS ATTORNEYS.

United States Patent Office 2,904,084
Patented Sept. 15, 1959

2,904,084

POWER-OPERATED SCREW FEED AND DRIVE MECHANISM

John Kruk, Skokie, Ill., assignor to Rogan Bros., Skokie, Ill., a partnership

Application March 31, 1958, Serial No. 725,304

13 Claims. (Cl. 144—32)

My invention relates to new and useful improvements in a screw feed and drive mechanism and has for one of its principal objects the mechanism of the class described wherein a screw is threaded automatically into a work piece.

Another object of my invention is in the provision in a device of this character of a screw delivery mechanism whereby the screws are fed and positioned with respect to an automatic screw driver by the movement of the work piece into position to receive the screw.

Another object of my invention is in the provision of a device of this character of a rotatable screw turret which receives and positions a screw relative to a screwdriver.

Yet another object of my invention is in the provision in a device of this character of a pneumatically operated positioning means for an electrically driven screwdriver.

Yet another object of my invention is in the provision in a device of this character of a means for feeding successive screws to the screw turret to be positioned with respect to the automatically driven screwdriver.

A still further object of my invention is in the provision in a device of this character whereby a screw is fed by gravity in a vertical plane and deposited into a mechanism for rotating said fed screw into a horizontal plane whereby it may be threaded into a suitable work piece.

Other objects will appear hereinafter.

The invention consists in the novel combination and arrangement of parts to be hereinafter described and claimed.

The invention will be best understood by reference to the accompanying drawings showing the preferred form of construction, and in which.

My invention relates to automatically feeding and positioning a screw in relation to an electrically operated pneumatically positioned screwdriver.

Figure 1:
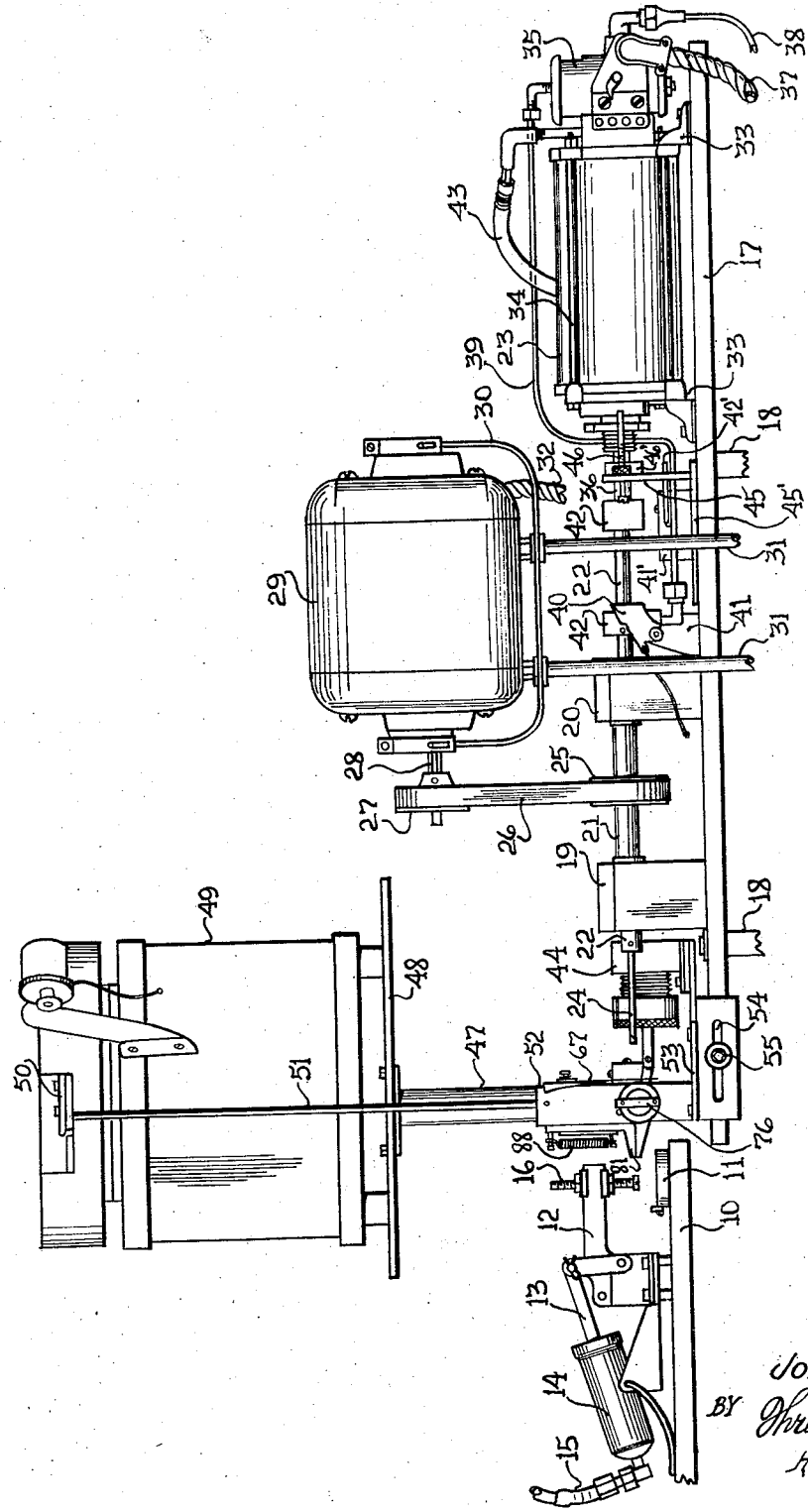
Fig. 1 is a fragmentary side elevational view of the screw feed and drive mechanism.

Referring to Fig. 1, I fragmentarily show a revolving plate 10 which has adjacent its peripheral edge a work piece holder 11 together with a pneumatically operated work piece securing means. This work piece holder and securing means makes up no part of the present invention but for the purpose of explanation includes a pivotal arm 12 movable through a vertically extending arc. This pivotal arm 12 is operatively connected to a plunger 13 of a pneumatically operated cylinder 14. This cylinder 14 has a conduit connection 15 with a compressed air supply, not shown. The free end of the pivotal arm 12 carries an adjustable screw 16 which may be adjusted to accommodate various sized work pieces placed in the work piece holder 11.

Adjacent to the periphery of the circular plate 10 is a table 17. This table 17 may be supported in its desired relation with respect to the circular plate 10 by suitable legs 18.

Carried by the table 17 are bearing blocks 19 and 20. Rotatably journalled through the bearing blocks 19 and 20 is a hollow drive shaft 21. Connected to and journalled in the hollow drive shaft 21 is a driven shaft 22. One end of the driven shaft 22 is connected by a thrust bearing 42 to a movable plunger 36 of an air cylinder 23. Carried by the opposite free end of the driven shaft 22 is a screwdriver 24. Fixedly carried on the drive shaft 21 is a pulley 25. This pulley 25 is operatively connected by a belt drive 26 to a pulley 27 carried by a drive shaft 28 of an electric motor 29. This electric motor 29 is carried by a U-shaped bracket 30 supported by suitable legs 31. Said motor 29 has a suitable electric conduit connection 32 to an electric power source not shown.

The air cylinder 23 is fixedly carried on the table 17 by suitable brackets 33, which have extending forward supporting rods 34. One end of the air cylinder 23 has operative connection to a two-way electrically operated valve 35. This valve is of a well known construction and makes up no part of the present invention except for its desired operation which is well known in the art. Such valve 35 has a suitable electric conduit connector 37. This valve 35 also has a suitable conduit connection 38 to a compressed air supply source not shown.

The top of the valve 35 has an air conduit connector 39 connected to a reversing switch 40 carried by a suitable bracket 41. A suitable yoke member 46' is carried by the plunger 36 of the air cylinder 23. The cylinder 23 has an air conduit connection 43 with a second air cylinder 44, Fig. 2, the purpose and operation of which will be hereinafter described.

Connected to the yoke member 46' and extending vertically at one side of the plunger 36 is a post 45. The lower free end of the post 45 is slidably carried by a track 45' carried by the table 17. Threaded through this post 45 in a horizontal plane is an adjusting screw 46. This post 45 and screw 46 is movable with the plunger 36 and when the plunger 36 is expelled from the cylinder 23, the head of the screw 46 will engage and actuate the reversing switch 40. Upon return movement of the plunger 36 together with the post 45, the post 45 will engage a switch actuating lever 42' of a switch 41' carried by the plate 17.

The driven shaft 22 together with the screwdriver shaft 24 is keyed to the drive shaft 21 in a manner well known in the art whereby the driven shaft 22 will not only be rotated by the drive shaft 21 but will be free to move laterally through a horizontal plane with respect thereto. The same condition applies between the opposite end of the driven shaft 22 and the end of the plunger 36 by reason of the thrust bearing 42.

Carried by the table 17 adjacent the forward edge thereof is a supporting post 47. This post 47 supports a vertically extending plate 48 which in turn supports an electrically operated vibratory elevator 49. Such elevator is in commercial use and consists of the construction as set forth in U.S. Patent No. 2,464,216. An automatically operated screw drop feed mechanism 50 is associated with the elevator 49. This screw drop feed mechanism is likewise in commercial use and consists of the construction as set forth in U.S. Patent No. 2,638,945.

Associated with the screw drop feed mechanism 50 is a hollow screw drop tube 51. The lower end of the screw drop tube 51 is in communication with a housing 52 carried by a plate 53 which has a slot 54 and screw 55 connection to one end of the table 17 adjacent the peripheral edge of the circular work plate 10.

Figure 5:
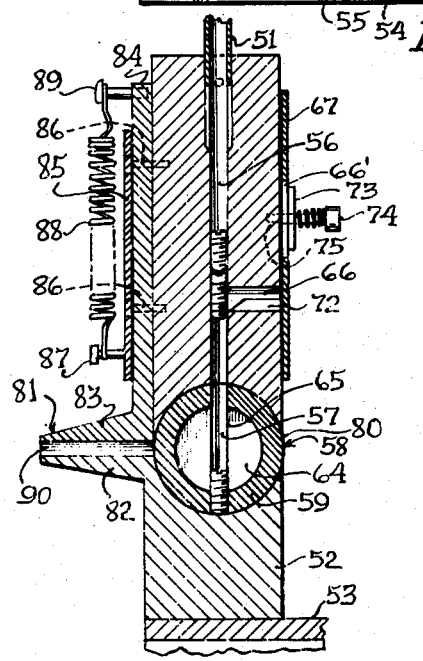
Fig. 5 is a fragmentary detail sectional view taken on line 5—5 of Fig. 4 of the screw feed and positioning means of my invention.

The housing 52, Fig. 5, has formed therein a vertical screw drop passage 56. This screw drop passage 56 has communication with a like screw passage 57 formed in one end of a rotatable turret member 58.

Figure 3:
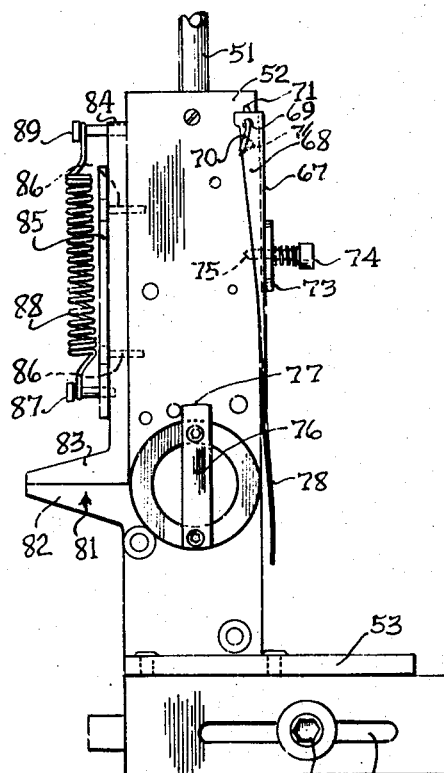
Fig. 3 is a fragmentary side elevational view of my screw feeding and positioning mechanism.
Figure 4:
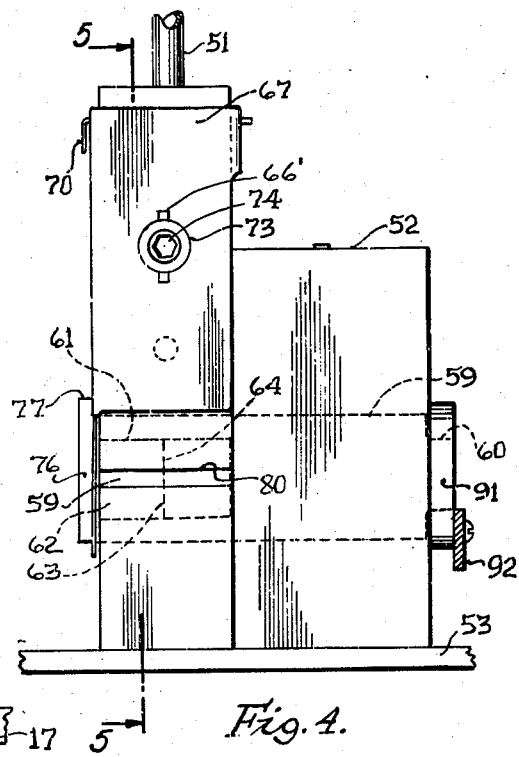
Fig. 4 is a fragmentary rear elevational view of the mechanism of Fig. 3.
Figure 7:
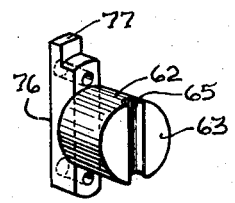
Fig. 7 is a perspective view of a portion of the screw turret.

Such turret member 58 comprises a rotatable bearing 59 suitably carried by the housing 52. One end of the bearing provides a laterally extending stud 60 extending outwardly from one side of the housing 52 as seen in Fig. 4. The other end of the bearing 59 is hollowed out as at 61 so as to receive a circular block 62. The face 63 of the block as seen in Fig. 7 is adapted to be disposed in facial abutment with the face 64, Fig. 5, of the bearing 59. Each of the faces 63 and 64 are recessed as at 65 so as to form a screw passage 57. A seat 66 is formed in the housing 52 from the back face thereof into communication with the screw tube passage 56 as seen in Fig. 5. A plate 67 is pivotally connected to the housing 52. This plate 67 provides a flange 68 which is bent so as to lie adjacent the one side of the housing 52 as seen in Fig. 3. This flange 68 is provided with an aperture 69 through which a connecting pin 70 passes. The housing 52 is provided with a series of vertically aligned apertures 71 which are adapted to receive the pin 70. It should be pointed out at this time that the length of the slot 66 is of such a size that it is equal to the distance between the uppermost aperture 71 and the lowermost aperture thereof formed in the housing 52. This for a purpose hereinafter described.

Carried by the plate 67 and extending inwardly of the slot 66 is a latch finger 72. The free end of the latch finger 72 projects slightly into the screw passage 56 and as such will engage the first thread of a screw passing therethrough as seen in Fig. 5. Carried by the back of the plate 67 is a washer 73. Threaded through this washer 73 and through a slot 66' formed in the plate 67 is a screw 74. This screw 74 has its one end 75 threaded into a suitable aperture formed in the housing 52.

The block 62 has a trip finger 76 carried thereby. This trip finger is mounted at the end of the bearing 59 exterior of the housing 52 as seen in Figs. 3 and 4. The trip finger 76 is provided with a tip 77 which is adapted to engage a depending finger 78 of the plate 67.

Figure 6:
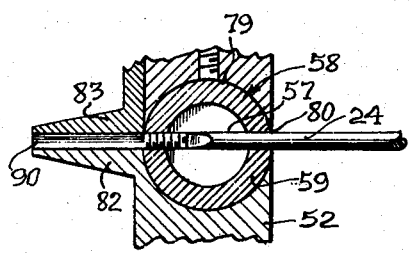
Fig. 6 is a fragmentary detail sectional view of the screw turret showing the screwdriver in engaging position with the screw therein.

The operation of the trip finger 76 is such that when the bearing 59 is rotated within the housing 52, the tip 77 will engage the finger 78 of the plate 67 and pivot it about its connection with the housing 52 so as to withdraw the latch finger 72 from engagement with a screw in the screw passage 56. Such screw will fall down the passage 56 until it engages a blank surface 79 of the bearing 59 which has been rotated into the position as seen in Fig. 6.

A portion of the back wall of the housing 52 provides a slot 80. It is through such slot that the screwdriver shaft 24 will project when the air cylinder 23 has been actuated in a manner hereinafter described. On the front wall of the housing 52 is formed a screw feed nozzle 81. This nozzle 81 is made of two sections, one section 82 being formed integral with the housing 52. The other section 83 provides in addition to a nozzle portion a vertical portion 84. Carried by and in spaced relation to the front wall of the housing 52 is a fixed plate 85. This plate 85 has studs 86 which project through slots formed in the portion 84 of the other section of the nozzle 81. One end of the plate 85 provides a stud 87 which has connected thereto one end of a coil spring 88. The opposite end of the coil spring 88 is connected to a stud 89 carried by the portion 84 of the other portion of the nozzle 81. A circular passage 90 is provided by the confronting nozzle portions 82 and 83 of the nozzle 81. In order to accommodate screws of different dimensions, the nozzle portion 83 by its pin and slot connection between the plate 85 and the front wall of the housing 52 is permitted to move upwardly against the tension of the spring 88, thus increasing the diameter of the passage 90.

The stud 60 of the rotatable bearing 59 has fixedly mounted thereon an actuating disc 91. This disc 91 has eccentrically connected thereto one end of a link member 92. This link member 92 is pivotally connected to one end of a movable plunger 93 of the heretofore mentioned second cylinder 44. The arrangement is such that when the plunger 93 is expelled by compressed air admitted into the cylinder 44 through the conduit 43 the disc 91 will be rotated. Such rotation of the disc 91 imparts rotation of the bearing 59, which in turn will rotate the turret member 58 formed therein in a clockwise direction as seen in Figs. 3 and 5. In such position the passage 57 formed in such turret member 58 will become horizontally aligned with the slot 80 formed in the back wall of the housing 52. In such a position the screw that is carried by the turret member 58 has one end thereof exposed to the head of the screw drive shaft 24 when it is moved in a manner hereinafter described into the position as shown in Fig. 6.

Figure 2:
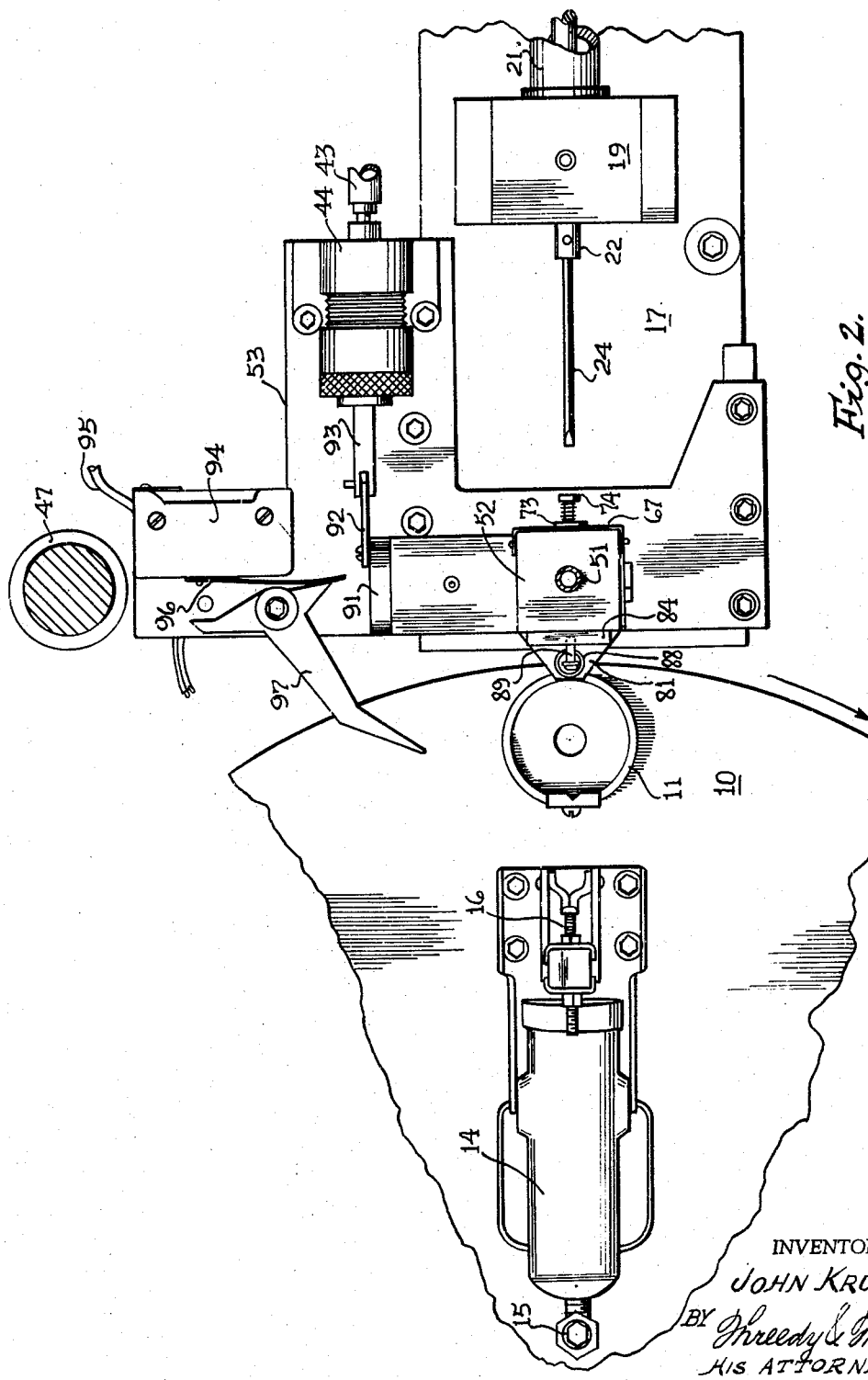
Fig. 2 is a fragmentary top plan view of my invention.

Carried by the plate 53 is a micro switch 94, Fig. 2. This switch 94 has electrical connection through the conductor 95, to the valve 35. Such electric energization of the valve 35 will permit the compressed air to pass through the conductor 38 through the valve 35 into the air cylinder 23 to expel the plunger thereof. The plunger will in turn horizontally move the driven shaft 22 and the screwdriver shaft 24 into the housing 52 through the slot 80 and through the screw passage 56 formed in the turret member 58 until it engages and threads the screw carried by the turret member 58 out through the nozzle 81 and into a suitable work piece carried by the work piece holder 11.

The micro switch 94 provides an external actuator arm 96 which is moved to close the micro switch contacts by a trip lever 97 pivotally carried by the plate 53. The trip lever 97 is pivoted so as to close the micro switch 94 when it is engaged by a work piece carried by the work piece holder 11 as the revolving plate 10 is rotated in the direction of the arrow as seen in Fig. 2.

The operation of my invention is as follows: the screws to be threaded into the work piece are placed in the receptacle of the vibratory elevator 49 and are fed by the screw drop feeding mechanism 50 into the screw drop tube 51. The electric motor 29 is caused to be energized so as to rotate the drive shaft 21 together with the driven shaft 22. A suitable work piece is placed in the work piece holder 11 on the rotatable circuit plate 10 and is pneumatically clamped in such holder. When the table 10 rotates and the work in holder 11 pivots the trip arm 97, the micro switch 94 is closed to energize the valve 35. The energization of the valve 35 permits passage of compressed air into the air cylinder 23 and the second air cylinder 44. By reason of the sizes of such air cylinders, the plunger 93 of the second air cylinder 44 will have completed its expelling movement prior to the complete expulsion of the plunger of the air cylinder 23. Such actuation of the plunger 93 will cause the bearing 59 and the screw turret member 58 thereof to be rotated through an arc in a clockwise direction as seen in Figs. 3 and 5. As the plunger of the air cylinder 23 is expelled, it will cause the screw driver shaft 24 to pass through the slot 80 formed in the back wall of the housing 52, as seen in Fig. 6. The screw passage 57 as formed in the turret member 58 is now in horizontal alignment with the slot 80 and the nozzle 81, thus the free end of the rotating screw driver shaft 24 is free to pass through such passage 57 so that it may engage the screw carried by the turret member 58 and force it out the nozzle and cause it to be threaded into the work held by a work piece holder 11. When the plunger 36 of the air cylinder 23 has reached its farthermost travel out of the air cylinder 23 the yoke member 46' and the screw 46 carried thereon will engage and actuate the reversing switch 40. This reversing switch 40 will cause the reversing operation of the air cylinder 23, that is to say the plunger 36 thereof will be drawn back into the cylinder. Thus the screwdriver shaft 24 will be withdrawn from its travel through the housing 52 and the screw turret 58.

As the air cylinder 23 is connected by conduit 43 with the second air cylinder 44, such second cylinder will be retained in its operative position i.e., with the plunger 93 thereof expelled therefrom, by reanson of the air within the air cylinder 23 which had expelled the plunger 36 now being permitted to pass through the conduit 43 to such second air cylinder 44.

The plunger 93 of the second air cylinder 44 will be returned therein causing the bearing 59 together with its turret member 58 to be returned to the position as seen in Fig. 5 only after the plunger 36 of the air cylinder 23 is in its retracted position and the screw driver 24 is fully withdrawn from the housing 52. When the turret member 58 has been rotated in the aforedescribed manner into the position as shown in Fig. 6, the tip 77 of the trip finger 76 of the block 62 was caused to engage the finger 78 of the plate 67 thereby causing withdrawal of the latch finger 72 from the screw passage 56 thereby permitting the connection screw to fall through such passage into the position shown in Fig. 6. When the empty screw turret member 58 has been pivoted to its original position (that shown in Figs. 3 and 5), such screw will fall through the screw passage 57 formed in the turret member 58 awaiting the next operation.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A screw feed and drive mechanism comprising in combination an electric motor, a screwdriver connected to and rotated by said motor, an air cylinder having a movable plunger operatively connected to said screwdriver so as to move the same through a horizontal plane while it is being rotated by said motor, valve means connected to said cylinder for admitting compressed air thereto so as to reciprocate said plunger through a horizontal plane, a magazine structure providing a reservoir for screws, a screw receiving and positioning housing, means providing a passage-way for said screws between said reservoir and said housing, means for successively positioning screws within said housing in a position to be engaged by said screwdriver, means for successively delivering screws through said passageway to said positioning means within said housing, means for moving said positioning means before said valve means actuates said plunger to move said screwdriver through a horizontal plane into said housing and into engagement with a positioned screw, and means actuated by each successive piece of work adapted to receive said screw for moving said screw positioning means and for actuating said valve.

2. A screw feed and drive mechanism comprising in combination an electric motor, a screwdriver connected to and rotated by said motor, an air cylinder having a movable plunger operatively connected to said screwdriver so as to move the same through a horizontal plane while it is being rotated by said motor, valve means connected to said cylinder for admitting compressed air thereto so as to reciprocate said plunger through a horizontal plane, a magazine structure providing a reservoir for screws, a screw receiving and positioning housing, means providing a passageway for said screws between said reservoir and said housing, means for successively positioning screws within said housing in a position to be engaged by said screwdriver, means for successively delivering screws through said passageway to said positioning means within said housing, means for moving said positioning means before said valve means actuates said plunger to move said screwdriver through a horizontal plane into said housing and into engagement with a positioned screw, and switch means actuated by each successive piece of work adapted to receive said screw for moving said screw positioning means and for actuating said valve.

3. A screw feed and drive mechanism comprising in combination an electric motor, a screwdriver connected to and rotated by said motor, an air cylinder having a movable plunger operatively connected to said screwdriver so as to move the same through a horizontal plane while it is being rotated by said motor, valve means connected to said cylinder for admitting compressed air thereto so as to reciprocate said plunger through a horizontal plane, a magazine structure providing a reservoir for screws, a screw receiving and positioning housing, means providing a passageway for said screws between said reservoir and said housing, a rotatable member for successively positioning screws within said housing in a position to be engaged by said screwdriver, means for successively delivering screws through said passageway to said rotatable member within said housing, means for moving said rotatable member before said valve means actuates said plunger to move said screwdriver through a horizontal plane into said housing and into engagement with a positioned screw, and means actuated by each successive piece of work adapted to receive said screw for moving said screw rotatable member for actuating said valve.

4. A screw feed and drive mechanism comprising in combination an electric motor, a screwdriver connected to and rotated by said motor, an air cylinder having a movable plunger operatively connected to said screwdriver so as to move the same through a horizontal plane while it is being rotated by said motor, valve means connected to said cylinder for admitting compressed air thereto so as to reciprocate said plunger through a horizontal plane, a magazine structure providing a reservoir for screws, a screw receiving and positioning housing, means providing a passageway for said screws between said reservoir and said housing, a rotatable member for successively positioning screws within said housing in a position to be engaged by said screwdriver, means for successively delivering screws through said passageway to said rotatable member within said housing, means for moving said rotatable member before said valve means actuates said plunger to move said screwdriver through a horizontal plane into said housing and into engagement with a positioned screw, and switch means actuated by each successive piece of work adapted to receive said screw for moving said screw rotatable member and for actuating said valve.

5. A screw feed and drive mechanism comprising in combination an electric motor, a screwdriver connected to and rotated by said motor, an air cylinder having a movable plunger operatively connected to said screwdriver so as to move the same through a horizontal plane while it is being rotated by said motor, valve means connected to said cylinder for admitting compressed air thereto so as to reciprocate said plunger through a horizontal plane, a magazine structure providing a reservoir for screws, a screw receiving and positioning housing, means providing a passageway for said screws between said reservoir and said housing, means for successively positioning screws within said housing in a position to be engaged by said screwdriver, means for successively delivering screws through said passageway to said positioning means within said housing, a second air cylinder for moving said positioning means before said valve means actuates said plunger to move said screwdriver through a horizontal plane into said housing and into engagement with a positioned screw, and means actuated by each successive piece of work adapted to receive said screw for moving said screw positioning means and for actuating said valve.

6. A screw feed and drive mechanism comprising in combination an electric motor, a screwdriver connected to and rotated by said motor, an air cylinder having a movable plunger operatively connected to said screwdriver so as to move the same through a horizontal plane while it is being rotated by said motor, valve means connected to said cylinder for admitting compresesd air thereto so as to reciprocate said plunger through a horizontal plane, a magazine structure providing a reservoir for screws, a screw receiving and positioning housing, means providing a passageway for said screws between said reservoir and said housing, means for successively positioning screws within said housing in a position to be engaged by said screwdriver, means for successively delivering screws through said passageway to said positioning means within said housing, a second air cylinder for moving said positioning means before said valve means actuates said plunger to move said screwdriver through a horizontal plane into said housing and into engagement with a positioned screw, and switch means actuated by each successive piece of work adapted to receive said screw for moving said screw positioning means and for actuating said valve.

7. A screw feed and drive mechanism comprising in combination an electric motor, a screwdriver connected to and rotated by said motor, an air cylinder having a movable plunger operatively connected to said screwdriver so as to move the same through a horizontal plane while it is being rotated by said motor, valve means connected to said cylinder for admitting compressed air thereto so as to reciprocate said plunger through a horizontal plane, a magazine structure providing a reservoir for screws, a screw receiving and positioning housing, means providing a passage-way for said screws between said reservoir and said housing, a rotatable member for successively positioning screws within said housing in a position to be engaged by said screwdriver, means for successively delivering screws through said passage-way to said rotatable member within said housing, a second air cylinder for moving said rotatable member before said valve means actuates said plunger to move said screwdriver through a horizontal plane into said housing and into engagement with a positioned screw, and means actuated by each successive piece of work adapted to receive said screw for moving said screw rotatable means and for actuating said valve.

8. A screw feed and drive mechanism comprising in combination an electric motor, a screw driver connected to and rotated by said motor, an air cylinder having a movable plunger operatively connected to said screwdriver so as to move the same through a horizontal plane while it is being rotated by said motor, valve means connected to said cylinder for admitting compressed air thereto so as to reciprocate said plunger through a horizontal plane, a magazine structure providing a reservoir for screws, a screw receiving and positioning housing, means providing a passage-way for said screws between said reservoir and said housing, a rotatable member for successively positioning screws within said housing in a position to be engaged by said screwdriver, means for successively delivering screws through said passage-way to said rotatable member within said housing, a second air cylinder for moving said rotatable member before said valve means actuates said plunger to move said screwdriver through a horizontal plane into said housing and into engagement with a positioned screw, and switch means actuated by each successive piece of work adapted to receive said screw for moving said screw rotatable member and for actuating said valve.

9. A screw feed and drive mechanism comprising in combination an electric motor, a screwdriver connected to and rotated by said motor, an air cylinder having a movable plunger operatively connected to said screwdriver so as to move the same through a horizontal plane while it is being rotated by said motor, valve means connected to said cylinder for admitting compressed air thereto so as to reciprocate said plunger through a horizontal plane, a magazine structure providing a reservoir for screws, a screw receiving and positioning housing, means providing a passage-way for said screws between said reservoir and said housing, a turret member for successively positioning screws within said housing in a position to be engaged by said screwdriver, means for successively delivering screws through said passage-way to said turret member within said housing, means for moving said turret member before said valve means actuates said plunger to move said screwdriver through a horizontal plane into said housing and into engagement with a positioned screw, and means actuated by each successive piece of work adapted to receive said screw for moving said screw turret member and for actuating said valve.

10. A screw feed and drive mechanism comprising in combination an electric motor, a screwdriver connected to and rotated by said motor, an air cylinder having a movable plunger operatively connected to said screwdriver so as to move the same through a horizontal plane while it is being rotated by said motor, valve means connected to said cylinder for admitting compressed air thereto so as to reciprocate said plunger through a horizontal plane, a magazine structure providing a reservoir for screws, a screw receiving and positioning housing, means providing a passage-way for said screws between said reservoir and said housing, a rotatable turret member for successively positioning screws within said housing in a position to be engaged by said screwdriver, means for successively delivering screws through said passage-way to said turret member within said housing, a second air cylinder for moving said turret member before said valve means actuates said plunger to move said screwdriver through a horizontal plane into said housing and into engagement with a positioned screw, and switch means actuated by each successive piece of work adapted to receive said screw for moving said screw turret member and for actuating said valve.

11. A screw feed and drive mechanism comprising in combination an electric motor, a screwdriver connected to and rotated by said motor, an air cylinder having a movable plunger operatively connected to said screwdriver so as to move the same through a horizontal plane while it is being rotated by said motor, valve means connected to said cylinder for admitting compressed air thereto so as to reciprocate said plunger through a horizontal plane, a magazine structure providing a reservoir for screws, a screw receiving and positioning housing, means providing a passage-way for said screws between said reservoir and said housing, means for successively positioning screws within said housing in a position to be engaged by said screwdriver, a yieldable latch member in said passage way and actuated by said positioning means for successively delivering screws through said passage-way to said positioning means within said housing, means for moving said positioning means before said valve means actuates said plunger to move said screwdriver through a horizontal plane into said housing and into engagement with a positioned screw, and means actuated by each successive piece of work adapted to receive said screw for moving said screw positioning means and for actuating said valve.

12. A screw feed and drive mechanism comprising in combination an electric motor, a screwdriver connected to and rotated by said motor, an air cylinder having a movable plunger operatively connected to said screwdriver so as to move the same through a horizontal plane while it is being rotated by said motor, vlave means connected to said cylinder for admitting compressed air thereto so as to reciprocate said plunger through a horizontal plane, a magazine structure providing a reservoir for screws, a screw receiving and positioning housing, means providing a passage-way for said screws between said reservoir and said housing, a rotatable member for successively positioning screws within said housing in a position to be engaged by said screwdriver, a yieldable latch member in said passage way and actuated by said positioning means for successively delivering screws through said passage-way to said rotatable member within said housing, means for moving said rotatable member before said valve means actuates said plunger to move said screwdriver through a horizontal plane into said housing and into engagement with a positioned screw, and means actuated by each successive piece of work adapted to receive said screw for moving said rotatable member and for actuating said valve.

13. A screw feed and drive mechanism comprising in combination an electric motor, a screwdriver connected to and rotated by said motor, an air cylinder having a movable plunger operatively connected to said screwdriver so as to move the same through a horizontal plane while it is being rotated by said motor, valve means connected to said cylinder for admitting compressed air thereto so as to reciprocate said plunger through a horizontal plane, a magazine structure providing a reservoir for screws, a screw receiving and positioning housing, means providing a passage-way for said screws between said reservoir and said housing, a turret member for successively positioning screws within said housing in a position to be engaged by said screwdriver, a yieldable latch member in said passage way and actuated by said positioning means for successively delivering screws through said passage-way to said turret member within said housing, means for moving said turret member before said valve means actuates said plunger to move said screwdriver through a horizontal plane into said housing and into engagement with a positioned screw, and means actuated by each successive piece of work adapted to receive said screw for moving said screw turret member and for actuating said valve.

References Cited in the file of this patent
UNITED STATES PATENTS

| | | |
|---|---|---|
| 2,544,165 | Krasnow | Mar. 6, 1951 |
| 2,670,077 | Drew | Feb. 23, 1954 |
| 2,681,668 | Lubbert | June 22, 1954 |
| 2,706,504 | Moore | Apr. 19, 1955 |
| 2,754,860 | Moore et al. | July 17, 1956 |
| 2,803,274 | Zubal et al. | Aug. 20, 1957 |
| 2,806,494 | Kull | Sept. 17, 1957 |
| 2,843,166 | Van Alstyne | July 15, 1958 |